United States Patent [19]

Lee et al.

[11] Patent Number: 4,730,121

[45] Date of Patent: Mar. 8, 1988

[54] POWER CONTROLLER FOR CIRCUITS WITH BATTERY BACKUP

[75] Inventors: Robert D. Lee, Denton; Donald R. Dias, Carrollton, both of Tex.

[73] Assignee: Dallas Semiconductor Corporation, Dallas, Tex.

[21] Appl. No.: 24,687

[22] Filed: Mar. 11, 1987

[51] Int. Cl.[4] .............................................. H02J 9/02
[52] U.S. Cl. ...................................... 307/66; 307/64; 307/87; 365/229
[58] Field of Search ..................... 307/64, 66, 129, 85, 307/87; 365/226, 227, 228, 229; 361/92, 93

[56] References Cited

U.S. PATENT DOCUMENTS

| | | | |
|---|---|---|---|
| 3,757,131 | 9/1973 | Krutz et al. | 307/66 |
| 3,859,638 | 1/1975 | Hume | 365/229 |
| 3,980,935 | 9/1976 | Worst | 365/229 |
| 4,122,359 | 10/1978 | Breikss | 365/229 X |
| 4,288,865 | 9/1981 | Graham | 307/64 X |
| 4,337,524 | 6/1982 | Parkinson | 365/229 |
| 4,388,706 | 6/1983 | Butler | 365/229 X |
| 4,441,031 | 4/1984 | Moriya et al. | 307/66 |
| 4,510,401 | 4/1985 | Legoult | 307/66 |
| 4,638,175 | 1/1987 | Bradford et al. | 307/66 X |
| 4,645,943 | 2/1987 | Smith, Jr. et al. | 307/64 X |

Primary Examiner—William M. Shoop, Jr.
Assistant Examiner—Paul Ip
Attorney, Agent, or Firm—Leonard & Lott

[57] ABSTRACT

A power controller for selectively coupling the voltage from a primary power source to a power output terminal or coupling the voltage from a battery backup input terminal to the power output terminal includes circuitry for receiving a reset or isolation signal. After receipt of the isolation signal when the primary power source is above a first threshold voltage, the primary power source and the backup battery source will be isolated from the output power terminal on the next occurrence of the removal of the voltage from the primary power source.

6 Claims, 3 Drawing Figures

POWER CONTROLLER FOR CIRCUITS WITH BATTERY BACKUP

TECHNICAL FIELD

This invention relates to circuits for controlling power supply voltages, and, more particularly, to circuits for controlling power supply voltages and their battery backup.

BACKGROUND OF THE INVENTION

Circuits have been developed in the past to provide automatic switching of a primary power supply voltage to a battery powered backup power supply when the primary power source has failed. Generally the batteries used with these circuits have had a limited useful life which was much less than the useful life of the circuit that they were attached to. Therefore these batteries, which required periodic checking and replacement, were designed to be removed during the useful life of the circuit.

Recently, however, long-life lithium energy cells have been developed which have a shelf life of many years and which hold the promise of eqaling or exceeding the useful life of their associated circuit requiring backup. For example, it is now possible to buy static RAMs which incorporate their own lithium cells into a single module, which lithium cells are expected to provide backup power for ten years or more.

The lithium energy cells are relatively small compared to other, older battery types; and it is possible to combines a lithium energy cell and a power controller into a single modular package. This power controller/lithium energy cell module can then be mounted onto a printed circuit board containing electronic circuitry to provide battery backup at the printed circuit board level.

At the printed circuit board level, however, at least one problem develops with the use of encapsulated power controllers with lithium energy cells which does not occur with static RAMs which incorporate their own lithium cell into a single module. The standby current required of a lithium cell on a printed circuit board may be several orders of magnitude higher than that required of a single static RAM, thus appreciably lessening the amount of time that the lithium cell can provide backup current to the electronic circuitry on the printed circuit board. As a result, the time that a printed circuit board sits in inventory before being installed into a system may cause a significant discharge of the battery. Until the time that the board is actually placed into operation, the printed circuit board usually does not require that the backup battery provide power to the board, and an appreciable portion of the energy originally stored in the battery may be wasted during this storage.

Therefore it can be appreciated that a power controller which switches a backup battery voltage onto the power supply terminal of an electrical circuit when the primary power source fails and which can also isolate the battery from the electrical circuit after receipt of an isolation command is highly desirable.

SUMMARY OF THE INVENTION

It is therefore an object of this invention to provide a power controller which will switch battery voltage onto an electrical circuit's power supply terminal when the primary power source has failed and which will also isolate the battery from the electrical circuit after receipt of an isolation signal.

As shown in an illustrated embodiment of the invention, a power controller provides electrical coupling between a primary power source, a backup battery, and a power supply terminal of an electrical circuit. The controller has a circuit for coupling the electrical power from the primary source to the electrical circuit when the power supply voltage of the primary source rises above a predetermined voltage and an additional circuit for coupling electrical power from the backup battery to the electrical circuit if the primary source voltage falls below the predetermined voltage. In addition, the power controller has a circuit for isolating the backup battery from the electrical circuit in response to an isolation signal.

In a further aspect of the invention, the power controller continues to maintain the isolation between the primary power source, the battery and the electrical circuit even after the isolation signal has been removed and until a further electrical signal is applied to the power controller.

In another aspect of the invention, the circuitry within the power controller for isolating the primary power source and the backup battery from the electrical circuit utilizes a bistable latch with hysteresis to provide immunity from voltage spikes which might be present on the primary power source.

BRIEF DESCRIPTION OF THE DRAWINGS

The aforementioned and other features, characteristics, advantages, and the invention in general, will be better understood from the following, more detailed description taken in conjunction with the accompanying drawings in which.

It will be understood that for clarity and where deemed appropriate, reference numbers have been repeated in the figures to show corresponding features.

DESCRIPTION OF THE PREFERRED EMBODIMENT

Figure 1:
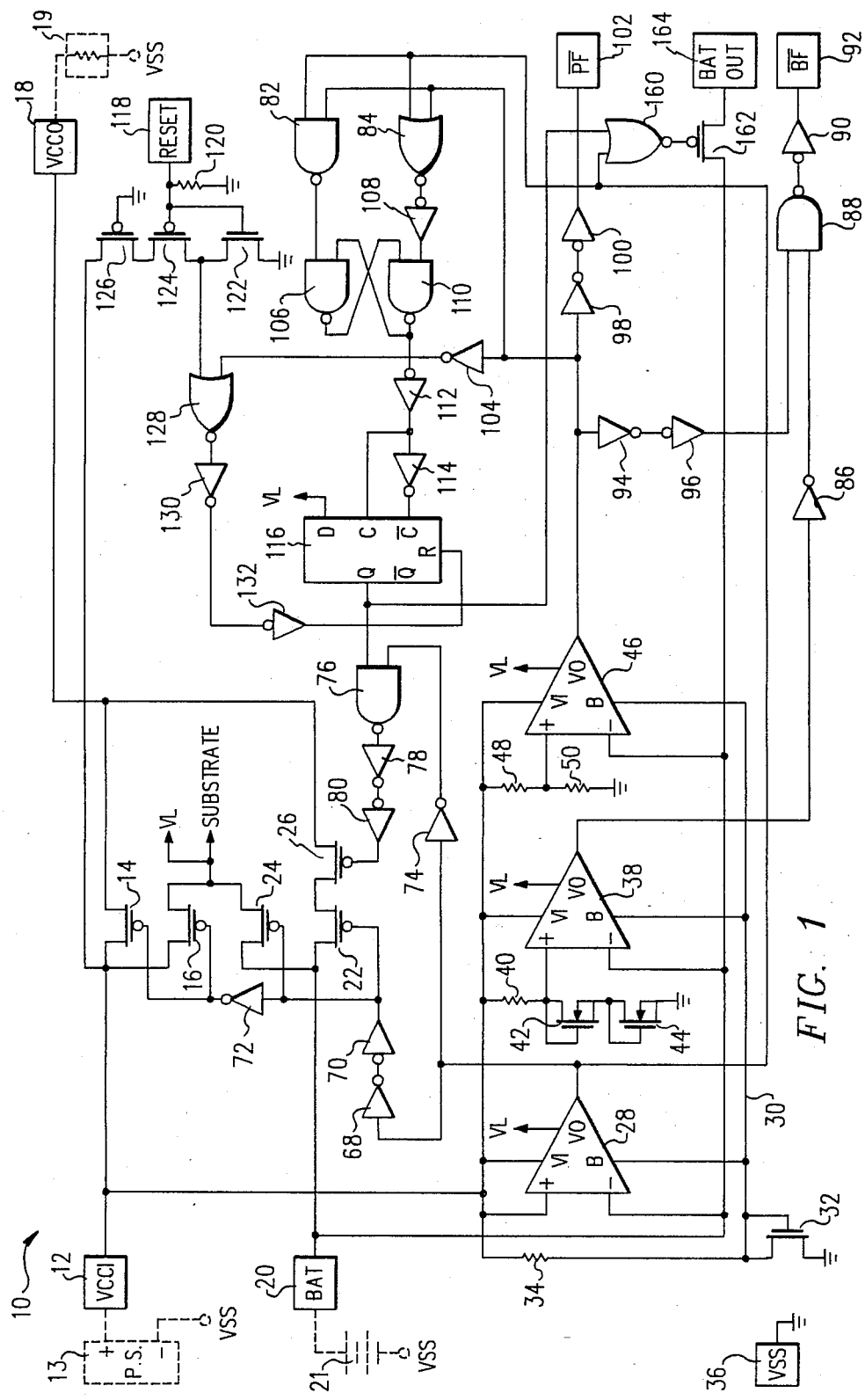
FIG. 1 is a schematic diagram of a poWer controller according to the present invention.

Turning now to the drawings, FIG. 1 is a schematic diagram of a power controller according to the present invention. The power controller circuit of FIG. 1 combines circuitry for detecting if the voltage of a primary power source is above or below two other voltages, provides MOS P-channel enhancement mode series-pass transistors for passing power from the primary power source to an electrical load, usually consisting of an electrical circuit, if the voltage of the primary source is above the voltage provided by a backup battery, and provides additional P-channel series-pass transistors to connect the battery voltage to the electrical circuit if the primary power source voltage is below the battery voltage. The preferred embodiment of the invention as shown in FIG. 1 is designed to operate with a primary power source of +5 volts and a backup battery which provides +3 volts, and to be embodied in a monolithic integrated circuit with an N-type substrate.

In addition, the power controller of FIG. 1 contains circuitry for isolating the electrical load from both the primary power source and the battery in response to a reset or isolation signal to the power controller. Further, the power controller provides status output signals to indicate whether the primary supply voltage has dropped below approximately 4.5 volts and also whether the battery voltage has dropped below approximately 2 volts. The battery voltage is also provided at an output terminal to enable direct monitoring of the battery voltage.

More specifically, the power controller 10 of FIG. 1 includes a primary power source input terminal 12 for receiving the power supply voltage from a primary power source 13. The primary power source input terminal 12 is connected to the source of a first P-channel series-pass transistor 14 and also to the source of a second P-channel series-pass transistor 16. The drain of the P-channel series-pass transistor 14 is connected to an output power terminal 18, which terminal is for connection to a power supply terminal of an electrical load 19 requiring a positive supply voltage, consisting, for example, of an electronic circuit board containing volatile data. A backup battery input terminal 20, for connection to a backup battery 21 is connected to the source of a third P-channel series-pass transistor 22 and to the source of a fourth P-channel series-pass transistor 24. The source of the P-channel series-pass transistor 22 is connected to the source of a fifth P-channel series-pass transistor 26, the drain of which is connected to the output power terminal 18. The series combination of the series-pass transistors 22 and 26 satisfies Underwriters Laboratories standards requiring two components between a lithium energy cell and a power supply terminal.

The drain of the P-channel series-pass transistor 24 is connected to the drain of the P-channel series-pass transistor 16 and is also connected to the N-type substrate of the monolithic integrated circuit embodying the power controller 10, to the logic circuits shown in FIG. 1 to provide VCC voltage to each of the individual logic circuits, and to a node labeled VL which is additionally connected to other portions of the power controller 10, as described below.

Also shown in FIG. 1 are three comparator circuits. A first comparator circuit 28 has a positive input connected to the primary power source input terminal 12 and a negative input connected to the backup battery input terminal 20. A first power supply voltage input terminal for the comparator 28 labeled VI is connected to the primary power source input terminal 12, and a second comparator power supply input terminal labeled VO is connected to the VL node. A bias voltage input, B, of comparator 28 is connected to a node 30 which is connected to the drain and gate of an N-channel bias current setting transistor 32 and to one end of a resistor 34, the other end of which is connected to the primary power source input terminal 12. The source of the bias current setting transistor 32 is connected to a common ground node of the integrated circuit which in turn is connected to a VSS reference voltage input terminal 36.

A second comparator 38 has a positive input terminal connected to one end of a resistor 40, the other end of which is connected to the primary power source input terminal 12. The positive input terminal of comparator 38 is also connected to the drain and gate of a first N-channel transistor 42, the source of which is connected to the drain and gate of a second N-channel transistor 44, the source of which in turn is connected to ground. The negative input terminal of comparator 38 is connected to the backup battery input terminal 20. A first power supply input terminal of comparator 38, labeled VI, is connected to the primary power source input terminal 12, and a second primary power supply input terminal, labeled VO, is connected to the VL node. A bias voltage input terminal, B, is connected to node 30.

A third comparator 46 has a positive input terminal connected to one end of a resistor 48, the other end of which is connected to the primary power source input terminal 12. The positive input terminal of comparator 46 is also connected to one end of another resistor 50, the other end of which is connected to ground. A negative input terminal of comparator 46 is connected to the backup battery input terminal 20. A first power supply input terminal, VI, of comparator 46 is connected to the primary power source input terminal 12, while a second primary power supply input terminal, VO, is connected to the VL node. A bias voltage input terminal, B, is connected to node 30.

Figure 2:
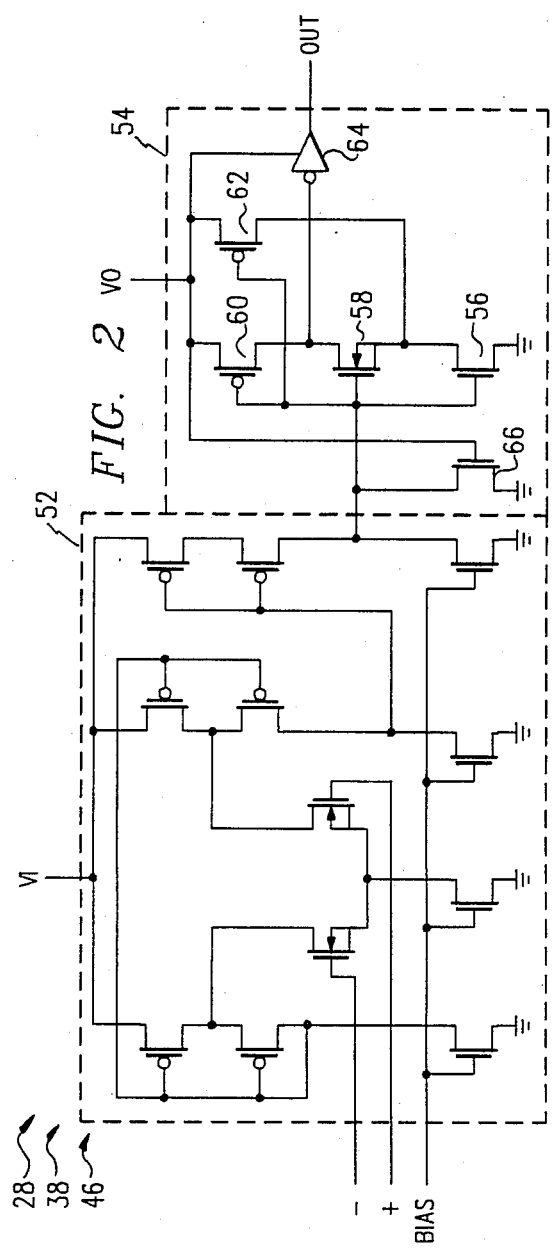
FIG. 2 is a schematic diagram of a comparator circuit shown in FIG. 1.

The three comparators 28, 38, and 46 have identical schematic diagrams, and the schematic diagram for the three comparators 28, 38, and 46 is shown in FIG. 2.

Turning now to FIG. 2, each of the comparators 28, 38, and 46 is comprised of two stages, the first being an amplifier input stage 52, which is a conventional input stage of a comparator consisting of a differential amplifier and is well understood by those skilled in the art. The amplifier input stage 52 is powered by the power supply input terminal VI which, as shown in FIG. 1, is connected to the primary power source input terminal 12 of FIG. 1. The second stage is an amplifier output stage 54 which contains an inverting circuit comprised of transistors 56, 58, 60, and 62. This inverting circuit is a Schmidt trigger circuit common in the art. The output of this inverting circuit is connected to the input of an inverter 64 also contained within the amplifier output stage 54. The output of the inverter 64 forms the output of the comparator circuit of FIG. 2.

Also contained within the amplifier output stage 54 is a pull-down transistor 66 which has its drain connected to the input terminal of amplifier output stage 54, its source connected to ground and its gate connected to the power supply input terminal V0. As is explained later, the power supply input terminal, V0, which is connected to the node VL in FIG. 1, is always powered either by the primary power source or by the backup battery. However, the VI power input terminal to amplifier input stage 52 is powered only by the primary power source voltage available at the primary power source input terminal 12 and thus may go to zero or float at an undefined voltage. Transistor 66 is a high impedance transistor which provides a method of biasing the input to the amplifier output stage 54 at ground potential when the VI power input terminal to the amplifier input stage 52 is at ground potential. Thus transistor 66 prevents the inverter circuit containing transistors 56, 58, 60, and 62 from operating in a their active region and thereby providing a current path from VO to ground which might occur if the input terminal to amplifier output stage 54 were allowed to float to an unspecified voltage. The Schmidt trigger circuit consisting of transistors 56, 58, 60 and 62 provides additional noise immunity for a condition in which the primary power source voltage is not present.

Because the amplifier input stage 52 requires bias currents, the advantage of providing the two amplifier stages 52 and 54 for the comparators 28, 38, and 46 is to lessen the drain on the battery voltage when the primary power supply voltage does not supply power to the power controller 10.

Referring again to FIG. 1, the output of comparator 28 is connected to the input of two series-connected inverters 68 and 70. The output of the two series-connected inverters 68 and 70 is connected to the gate of the P-channel series-pass transistor 22, to the gate of the P-channel series-pass transistor 24 and to the input of another inverter 72. The output of inverter 72 is connected to the gate of P-channel series-pass transistor 16 and to the gate of P-channel series-pass transistor 14. The output of comparator 28 is also connected to the input of another inverter 74, the output of which is connected to a first input of a NAND gate 76. The output of the NAND gate 76 is connected to the input of two series-connected inverters 78 and 80, and the output of the series-connected inverters 78 and 80 is connected to the gate of the P-channel series-pass transistor 26. The output of the comparator 28 is also connected to a first input of a NAND gate 82 and to a first input of a NOR gate 84.

The output of the comparator 38 is connected to the input of an inverter 86, the output of which is connected to a first input of a NAND gate 88. The output of the NAND gate 88 is inverted by an inverter 90, the output of which is connected to a battery fail output terminal 92, labeled $\overline{BF}$ in FIG. 1.

The output of the comparator 46 is connected to the input of a series-connected pair of inverters 94 and 96. The output of the series-connected pair of inverters 94 and 96, is connected to a second input of the NAND gate 88. The output of the comparator 46 is also connected to the input of another series-connected pair of inverters 98 and 100. The output of the series-connected pairs of inverters 98 and 100 is connected to a primary power failure output terminal 102, which is labeled $\overline{PF}$ in FIG. 1. The output of the comparator 46 is also connected to the input of another inverter 104, to a second input of the NAND gate 82 and to a second input of the NOR gate 84.

The output of the NAND gate 82 is connected to a first input of another NAND gate 106. The output of the NOR gate 84 is connected to the input of an inverter 108, the output of which is connected to a first input of yet another NAND gate 110. The output of the NAND gate 110 is connected to a second input of the NAND gate 106, and the output of the NAND gate 106 is connected to a second input of the NAND gate 110. Thus the NAND gates 106 and 110 are configured in a R-S flip-flop configuration. The output of the NAND gate 110 is connected to the input of an inverter 112, the output of which is connected to the input of another inverter 114, and also to the C input of a D latch 116. The output of the inverter 114 is connected to the $\overline{C}$ input of the D latch 116.

The power controller 10 of FIG. 1 has a reset or isolation terminal 118, also labeled R in FIG. 1, for receiving a reset or isolation signal to cause the power controller 10 to isolate the primary power source input terminal 12 and the backup battery input terminal 20 from the output power terminal 18. The reset or isolation input terminal 118 is connected to one end of a resistor 120, the other end of which is connected to ground. The reset or isolation input terminal 118 is also connected to the gate of an N-channel transistor 122, and to the gate of a P-channel transistor 124. The source of the P-channel transistor 124 is connected to the drain of another P-channel transistor 126, the source of which is connected to the primary power source input terminal 12, and the gate of which is connected to ground. The source of the transistor 122 is connected to ground while the drain of the transistor 122 is connected to the drain of the transistor 124 and to a first input of a NOR gate 128, the output of which is connected to the input of a first inverter 130. A second input to the NOR gate 128 is connected to the output of the inverter 104. The output of the inverter 130 is connected to the input of another inverter 132, the output of which is connected to an R input of the D latch 116. A D input of the D latch 116 is connected to the VL node.

Figure 3:
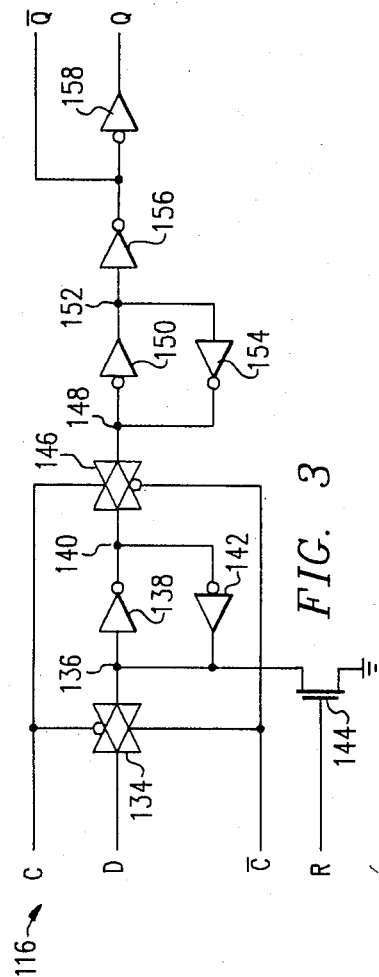
FIG. 3 is a schematic diagram of a D latch shown in FIG. 1.

A schematic diagram for the D latch 116 is shown in FIG. 3. As shown in FIG. 3, the D input is connected to a first data terminal of a first transmission gate 134, the other data terminal of which is connected to an internal node 136. The internal node 136 is also connected to the input of a first inverter 138, the output of which is connected to a second internal node 140. Another inverter 142 has its input connected to node 140 and its output connected to node 136. The R input of the D latch 116 is connected to the gate of an N-channel transistor 144, the drain of which is connected to the node 136 and the source of which is connected to ground. The node 140 is also connected to a first data terminal of a second transmission gate 146, the other data terminal of which is connected to another internal node 148. The internal node 148 is connected to the input of an inverter 150, the output of which is connected to another internal node 152. Another inverter 154 has its input connected to the node 152 and its output connected to the node 148. The node 152 is also connected to the input of another inverter 156, the output of which is connected to a $\overline{Q}$ output of the D latch 116 and also to the input of another inverter 158. The output of inverter 158 is connected to a Q output of D latch 116. The C input of the D latch 116 is connected to the gate of the P-channel transistor of the transmission gate 134 and to the gate of the N-channel transistor of the transmission gate 146. The $\overline{C}$ input of the D latch 116 is connected to the gate of the N-channel transistor of the transmission gate 134 and to the gate of the P-channel transistor of the transmission gate 146.

The D latch 116 shown in FIG. 3 transfers data appearing at the D input to node 136 when the C input is at a low logic level and the $\overline{C}$ input is at a high logic level. As used herein the term "low logic level" means a logic level having a voltage near ground, and the term "high logic level" means a logic level having a voltage near the voltage of the VL node. Correspondingly, node 140 is isolated from the node 148 when the C input is at a low logic level and the $\overline{C}$ input is at a high logic level. The Q output of the D latch 116 is the inverse of the logic level at the node 148, and the $\overline{Q}$ output of the D latch 116 is the same logic level as present at the node 148. The inverters 150 and 154 operate to preserve the logic level at node 148 when node 148 is isolated from the node 140 by the action of the transmission gate 146. Similarly, the inverters 138 and 142 operate to preserve the logic level present at the node 136 when the node 136 is isolated from the D input of the D latch 116 by the operation of the transmission gate 134. When the transmission gate 134 is conducting, the D input signal to the D latch 116, which, as shown in FIG. 1, is the VL node, has sufficient drive to overcome the output drive of the inverter 142 such that when transmission gate 134 is conducting the D input forces the node 136 to the logic level of the D input; and the corresponding inverse of the logic level of the D input is formed at the node 140. The node 136 can also be pulled to ground potential by the action of the transistor 144 when the R input to D latch 116 is at a high logic level. As will be described later with respect to operation of the power controller 10 of FIG. 1, other circuitry outside of the D latch 116 prevents the R input of the D latch 116 from going to a high logic level when the transmission gate 134 is conducting, thus preventing a situation in which the transistor 144 would provide a current path to ground from the VL node.

When the transmission gate 146 is conducting, the inverter 138 may be trying to pull the node 148 to a logic level opposite to the output of the inverter 154. The relative drive potentials of the inverters 138 and 154 are ratioed such that the inverter 138 will always overcome the output drive capabilities of the inverter 154, thus forcing the node 148 to the logic level present at the node 140 when the transmission gate 146 is conducting.

Referring again to FIG. 1, the Q output of the D latch 116 is connected to a second input of the NAND gate 76 and into a first input of another NOR gate 160. The output of NOR gate 160 is connected to the gate of a P-channel gating transistor 162, the drain terminal of which is connected to a battery voltage output terminal 164 labeled BAT OUT in FIG. 1. The source of the gating transistor 162 is connected to the backup battery input terminal 20. A second input of the NOR gate 160 is connected to the output of the comparator 28.

CIRCUIT OPERATION

The power controller circuit of FIG. 1 operates by monitoring the voltage level at the primary power source input terminal 12 with respect to the battery voltage appearing at the backup battery input terminal 20. More specifically, comparator 28 directly compares the primary source voltage with the battery voltage and enables (i.e., makes conductive) the series pass transistors 14 and 16 and disables (i.e., makes nonconductive) the series pass transistors 22 and 24 when the primary source voltage is greater than the battery voltage. Conversely, when the battery voltage is greater than the primary source voltage, the series pass transistors 22 and 24 are enabled while series pass transistors 14 and 16 are disabled. At the same time that the series pass transistor 22 is enabled, the series pass transistor 26 is also enabled unless the Q output of the D latch 116 is at a low logic level. The Q output of the D latch 116 will only be brought to a low logic level if a high logic level reset or isolation signal is received at the reset or isolation input terminal 118 during the time that the voltage at the primary power source input terminal 12 is above approximately 4.5 volts. Otherwise the series pass transistors 22, 24, and 26 are enabled whenever the voltage at the backup battery input terminal 20 is greater than the voltage appearing at the primary power source input terminal 12 and are disabled while the series pass transistors 14 and 16 are enabled whenever the voltage applied to the primary power source voltage input terminal 12 is greater than the voltage applied to the backup battery input terminal 20.

The node VL is always powered either by the voltage from the primary power source input terminal 12 through the series pass transistor 16 or by the voltage from the backup battery input terminal 20 through the series pass transistor 24. The N-type substrate and the logic circuits and the node VL itself are always at a positive voltage so long as either a battery or a primary power source is connected to the appropriate terminals of the power controller 10.

Comparator 46 has its positive input connected to the middle node of the resistor divider 48 and 50. Values for the resistors 48 and 50 are selected such that the positive input is 3 volts or greater when the voltage appearing at the primary power supply input terminal 12 is 4.5 volts or greater. Thus the output of the comparator 46 is at a high logic level when the voltage of the primary power source is greater than 4.5 volts and is at a low logic level when the primary power source is below 4.5 volts (assuming that the battery voltage at input terminal 20 is at 3 volts). The output of the comparator 46 is inverted twice by the inverters 98 and 100 to drive the primary power failure output terminal 102 to a low logic level to indicate a power failure condition whenever the primary power source voltage drops below 4.5 volts (assuming that the backup battery voltage is at 3 volts). This low logic level signal at the primary power failure output terminal 102 can be used to indicate to the electrical circuit an impending primary power failure so that the electrical circuit being powered can be placed in a low current battery backup mode.

From FIG. 2 it will be appreciated that when the voltage appearing at the primary power source input terminal 12 drops to 0 volts, a low logic level voltage is produced at each output of the comparators 28, 38 and 46, irrespective of the state of the input voltages at the plus and minus inputs to the comparators. For example, as the primary power source voltage drops to below the battery voltage, the output of the comparator 28 drops to a low logic level and stays at a low logic level even after the primary power source is unable to supply any voltage to the power controller circuit. Similarly, when the primary power source drops below 4.5 volts the output of the comparator 46 drops to a low logic level (for a 3 volt battery voltage) and stays at a low logic level even after the primary power source has failed.

The comparator 38 has its plus input voltage determined by the ratio of the voltage produced at the junction of the resistor 40 and the transistor 42 which, in the preferred embodiment with a +5 volt primary power source voltage appearing at the primary power source input terminal 12, is +2 volts. Thus, when the battery voltage is greater than +2 volts (the normal condition), the output of the amplifier 38 is at a low logic level. That low logic level output is inverted by the logic gates 86, 88, and 90 to produce a high logic level at the battery fail output terminal 92. However, when the battery voltage drops below +2 volts and the primary source voltage is greater than +4.5 volts, the output of the comparator 38 goes to a high logic level and the voltage at the battery fail output terminal 92 drops to a low logic level, indicating a battery failure. However, since the output of the comparator 38 is a low logic level whenever the primary power source is unable to hold the output of the amplifier input stage 52 of the comparator 38 at a high logic level, the output of the comparator 38 would indicate a false battery failure condition at the battery fail output terminal 92, except that NAND gate 88 inhibits this false signal during the time that primary power source has dropped below +4.5 volts. The NAND gate 88 also forces the battery fail output terminal 92 low so that when the backup battery is providing the supply voltage to the inverter 90 through the VL node, the backup battery will not loose charge through the inverter 90 to a low impedance which might be connected to the battery fail output terminal 92.

The power controller of FIG. 1 includes a hysteresis threshold circuit consisting of the logic gates 82, 84, 106, 108 and 110. More specifically, when the battery voltage is present at the backup battery input terminal 20 and before the primary power source has been applied to input terminal 12, the output of the comparators 28 and 46 are at a low logic level. Thus the inputs for the NAND gate 82 and the NOR gate 84 are both low logic levels which forces the output of NAND gate 110 to a high logic level which in turn is inverted by the inverter 112 to cause the C input of the D latch 116 to be a low logic level and the $\overline{C}$ input of the D latch 116 to be a high logic level.

Turning now to FIG. 3, a low logic level on the C input and a high logic level on the $\overline{C}$ input of the D latch 116 causes the transmission gate 134 to be enabled and the transmission gate 146 to be disabled. The logic level at the D input of the D latch 116 is that of the VL node. Under these conditions the node 136 is at a high logic level (since it has a low impedance path to the VL node which is always at a high logic level) and the node 140 is at a low logic level. And unless a reset or isolation signal was received at the reset or isolation input terminal 118 during the prior period when the primary power supply voltage at input terminal 12 was greater than 4.5 volts, the voltage at the node 148 will be a low logic level which in turn will cause the Q output of the D latch 116 to be at a high logic level.

Returning now to FIG. 1, with the Q output of the D latch 116 at a high logic level and the output of the comparator 28 at a low level (thereby making the output of the inverter 74 high), the output of the NAND gate 76 will be at a low logic level which in turn will provide a low logic level to the gate of the P-channel series pass transistor 26 to thereby enable or make conductive the series pass transistor 26. Since the P-channel series pass transistor 22 is made conductive by the low output of the comparator 28, both of the transistors are conductive which passes the battery voltage to the electrical load 19 connected to the output power terminal 18 of the power controller 10.

As the primary power supply voltage at the primary power input terminal 12 rises to greater than the battery voltage, the output of the comparator 28 moves to a high logic level which in turn disables the series pass transistors 22, 26 and 24, but enables the series pass transistors 14 and 16 to thereby provide power from the primary power source input terminal 12 to the electrical load 19. When the voltage applied to the primary power source input terminal 12 rises above the battery voltage, but stays below the 4.5 volt threshold of the comparator 46, then the output of the comparator 28 will be at a high logic level and the output of the comparator 46 will be a low logic level. Consequently the NAND gate 82 and the NOR gate 84 will each have one of their inputs at a high logic level and one of their inputs at a low logic level. Under this condition the output of the NAND gate 82 will be at a high logic level and the output of the inverter 108 will also be at a high logic level, and thus there will be no change in the state of the NAND gates 106 and 110, and the C input to the D latch 116 will continue to be in a low logic level state while the $\overline{C}$ input to the D latch 116 will continue to be in a high logic level state. Thus, there will be no changes in the logic levels within the D latch 116 and the Q output of the D latch 116 will continue to be at a high logic level.

It will be appreciated that this high logic level from the Q output of the D latch 116 forces the output of the NOR gate 160 to a low logic level to thereby enable the gating transistor 162 to pass the voltage appearing at the backup battery input terminal 20 to the battery voltage output terminal 164.

When the voltage at the primary power source input terminal 12 has risen above 4.5 volts, the output of the comparators 28 and 46 will both be at a high logic level which causes the output of the NAND gate 82 to be at a low logic level which, in turn, forces the output of the NAND gate 106 to a high logic level; and since the output of the inverter 108 is at a high logic level, the output of the NAND gate 110 will switch to a low logic level which causes the output of the inverter 112 to produce a high logic level at the C input of the D latch 116 and a low logic level at the $\overline{C}$ input of the D latch 116. Upon examination of FIG. 3, it becomes evident that this high logic level on the C input and a low logic level on the $\overline{C}$ input causes the transmission gate 134 to be disabled while the transmission gate 146 becomes enabled and, thus, the high logic level voltage at the node 136 is passed to the Q output of the D latch 116. The Q output of the D latch 116 then remains at a high logic level.

However, it is at this time when the voltage at the primary power source input terminal 12 is above 4.5 volts that the reset or isolation input terminal 118 is enabled. If a high logic level voltage is applied at the reset or isolation input terminal 118 under this condition, a low logic level is produced at the junction of the transistors 122 and 124 which in turn produces a high logic level at the output of the NOR gate 128. A high level at the output of the NOR gate 128 is inverted by the inverters 130 and 132 to produce a high logic level at the R input of the D latch 116. As can be seen from FIG. 3, this high logic level voltage at the R input of D latch 116 causes the transistor 144 to be conductive which in turn pulls the node 136 to a low logic level. This low logic level at the node 136 is passed through to the Q output of the D latch 116. A low logic level voltage on the Q output of the D latch 116 causes the output of the NAND gate 76 to stay at a high logic level, irrespective of the output of the comparator 28. (The output of the NAND gate 76 is already at a high logic level since the output of the comparator 28 is at a high logic level.) A low logic level at the Q output of the D latch 116 produces a low logic level at one of the inputs of the NOR gate 160. However, because the primary power source voltage is above the battery voltage, the output of the comparator 28 is at a high logic level which in turn causes the output of the NOR gate 160 to be at a low logic level thereby enabling the gating transistor 162.

After the reset or isolation signal has been received at reset or isolation input terminal 118 when the primary power source is above 4.5 volts, the node 136 of the D latch 116 will be at a low logic level. Thereafter, when the voltage at the primary power source input terminal 12 drops below 4.5 volts but is still above the battery voltage, the output of the comparator 46 will be a low logic level while the output of the comparator 28 will be at a high logic level which will produce both a high logic level and a low logic level at each of the inputs of the NAND gate 82 and the NOR gate 84. Thus the state of the NAND gates 106 and 110 will not change and the state of the D latch 116 will not change. Since the output of comparator 46 is at a low logic level, the output of the NAND gate 88 will rise to a high logic level thereby creating a low logic level at the battery fail output terminal 92.

As the voltage at the primary power source input terminal 12 decreases further to below the battery voltage, the output of the comparator 28 drops to a low logic level thereby disabling the series pass transistors 14 and 16 and enabling the series pass transistors 22 and 24. This low level at the output of the comparator 28 also causes both inputs of the NAND gate 82 and both inputs of the NOR gate 84 to be at a low logic levels which in turn cause the output of the inverter 108 to be at a low logic level, forcing the output of the NAND gate 110 to be at a high logic level, which results in a low logic level being applied to the C input of the D latch 116 and a high logic level to be applied to the $\overline{C}$ input of the D latch 116.

This combination of logic levels disables the transmission gate 146 and enables the transmission gate 134. Thus a high logic level at the node 148 is trapped and isolated from the D input. Accordingly the Q output remains at a low logic level which in turn causes the output of the NAND gate 76 to remain at a high logic level, thereby continuing to disable the series pass transistor 26 and isolating the voltage applied to the battery input terminal 20 from the electrical load 19.

This combination of logic levels also forces the output of the NOR gate 160 to a high logic state to thereby disable the gating transistor 162. This nonconductive state of the gating transistor 162 isolates the battery voltage output terminal 164 from the backup battery. Therefore any load connected to the battery voltage output terminal 164 will not drain charge from the backup battery 21 when the power controller 10 is in the isolation condition and when the voltage at the primary power source input terminal 12 is greater than the voltage at the backup battery input terminal 20.

After the power controller 10 has entered an isolation condition in which the backup battery is isolated from the electrical load, the controller will remain in this isolation condition until the voltage at the primary power source input terminal 12 rises above +4.5 volts, even though the voltage at the primary power source input terminal 12 may rise above the voltage at the backup battery input terminal 20 which will cause the primary power source 13 to be coupled to the electrical load 19 through the P-channel series-pass transistor 14. For example, if the voltage at the primary power source input terminal 12 were to rise above the backup battery voltage during an isolation condition, but not rise to +4.5 volts, and then were to drop below the backup battery voltage, the backup battery would continue to be isolated from the output power terminal 18, and the power controller 10 would remain in the isolation condition. Thus, the reapplication of a primary power source voltage of +4.5 volts or greater can be regarded as an electrical signal to the power controller 10 to switch out of the isolation condition.

After the primary power has been restored, the power controller 10 will switch the backup battery voltage to the electrical load 19 whenever the voltage at the primary power source input terminal 12 drops below the voltage at the backup battery input terminal 20 unless another reset or isolation signal is received at the reset or isolation input terminal 118 as described above.

If a high logic level reset or isolation signal is not received at the reset or isolation input terminal 118 during the time that the primary power supply voltage is above 4.5 volts, then the Q output of the D latch 116 remains at a high logic level and the voltage applied to the battery backup input terminal 20 is switched to power the electrical load 19 if the voltage at the primary power source input terminal 12 drops below the voltage at the backup battery input terminal 20.

The hysteresis circuit comprised of gates 82, 84, 106, 108 and 110 ensure that a moderate spike on the primary power supply voltage will not inadvertently cancel a reset or isolation signal appearing at input terminal 118. For example if a reset or isolation signal is received by the power controller 10 of FIG. 1 while the primary power source is above approximately +4.5 volts, then the next time the primary power source voltage drops below the backup battery voltage, the power controller 10 will switch into the isolation condition and will switch out of the isolation condition when the primary power source voltage rises above +4.5 volts again. However, had the voltage required to switch out of the isolation condition been the battery voltage, then a positive noise spike on the primary power source voltage which occurred just as the primary power source voltage dropped below the battery voltage would cause the power controller 10 to detect that the primary power source voltage had exceeded the backup battery voltage. The power controller 10 would then switch itself out of the isolation condition, and would couple the backup battery to the electrical load 19 when the noise spike faded.

By the use of this reset or isolation signal, the backup battery and the power controller 10 of FIG. 1 can be stored for long periods of time without appreciably discharging the battery power.

Although the invention has been described in part by making detailed reference to a certain specific embodiment, such details intended will be understood to be instructional rather than restrictive. It will be appreciated by those skilled in the art that many variations can be made in the structure and mode of operation without departing from the spirit and scope of the invention, as disclosed in the teachings contained herein. For example, it would be possible to provide at an output terminal a positive indication that a reset or isolation pulse has been received and that the battery voltage will not be transferred to the electrical load attached to output terminal 18. Also, another alternative would be to provide circuitry for receipt of a pulse to disable a reset or isolation pulse if such a pulse were inadvertently applied.

Other possible variations include the recognition of a reset pulse which varies between ground and a negative voltage; or to require a reset pulse which has certain attributes to guard against a false detection of a reset signal. One such attribute could be to require the reset pulse to be of a predetermined width. Finally, an obvious variation which is within the scope of the present invention is to modify the power controller 10 for use with negative supply voltages.

What is claimed is:

1. A power controller for providing electrical coupling between a primary power source, a backup battery, and an electrical circuit comprising:
    (a) first means for coupling electrical power from said primary source to said electrical circuit if a power supply voltage of said primary source rises above a first predetermined voltage and if said power controller is not in an isolation condition;
(b) second means for coupling electrical power from said backup battery to said electrical circuit if said power supply voltage of said primary source falls below said first predetermined voltage and if said power controller is not in said isolation condition; and
(c) means for placing said power controller in said isolation condition in response to an external signal such that said primary power source and said backup battery are simultaneously and continuously isolated from said electrical circuit.

2. The power controller as set forth in claim 1 wherein said means for isolating said primary power source and said backup battery continues to isolate said primary source and said backup battery from said electrical circuit after said reset signal is removed and until a further electrical signal is applied to said power controller.

3. The power controller as set forth in claim 2 wherein said further electrical signal is the reapplication of said primary power source voltage to said power controller.

4. The power controller as set forth in claim 3 further including bistable latch means coupled to said means for isolating said primary power source and said backup battery, and to an input terminal for receiving said primary power source, said bistable latch means for enabling said means for isolating said primary power source and said backup battery when said primary power source is above a second predetermined voltage, said second predetermined voltage being greater than said first predetermined voltage.

5. A power controller for use in conjunction with a backup battery where said power controller and backup battery are in a sealed module, said power controller comprising:
(a) a first input terminal for receiving power from a primary power source;
(b) a second input terminal for receiving power from a backup battery;
(c) a first output terminal for providing power to an electrical circuit;
(d) first comparison means coupled to said first input terminal and said second input terminal and to said first output terminal for creating an electrically conductive path between said first input terminal and said first output terminal when the voltage at said first input terminal is greater than the voltage at said second input terminal, and for forming an electrical conductive path between said second input terminal and a first internal node when the voltage at said first input terminal is less than the voltage at said second input terminal;
(e) second comparison means for determining if a predetermined fraction of the voltage at said first input terminal is greater than the voltage at said second input terminal;
(f) a third input terminal for receiving an isolation signal;
(g) storage means coupled to said first comparison means, to said second comparison means and to said third input terminal for setting a second internal node to a first logic state when said second comparison means detects that said predetermined fraction of the voltage at said first input terminal rises above the voltage at said second input terminal, and for setting said second internal node to a second logic state when an isolation signal is received at said third input terminal during the time after said second comparison means detects that said predetermined fraction of the voltage at said first input terminal rises above the voltage at said second input terminal and before said first comparison means detects that the voltage at said first input terminal falls below the voltage at said second input terminal;
(h) logic means coupled to said first internal node, to said second internal node, to said first comparison means, and to said first output terminal for providing a conductive path between said first internal node and said first output terminal when said second internal node is at said first logic state, and when the voltage at said first input terminal is less than the voltage at said second input terminal;
(i) said first input terminal and said second input terminal being isolated from said first output terminal when said second internal node is at said second logic state and the voltage at said first input terminal is less than the voltage at said second input terminal.

6. A power controller for providing electrical coupling between a primary power source, a backup battery, and an electrical circuit comprising:
(a) first switching means coupled between said primary power source and said electrical circuit, said first switching means being non-conductive if a power supply voltage of said primary source is below a reference voltage;
(b) second switching means coupled between said backup battery and said electrical circuit, said second switching means being non-conductive if said power supply voltage of said primary source is above said reference voltage; and
(c) isolation means for placing said power controller in an isolation condition in response to an external signal wherein said primary power source and said backup battery are simultaneously and continuously isolated from said electrical circuit.

* * * * *

REEXAMINATION CERTIFICATE (3626th)

United States Patent [19]
Lee et al.

[11] B1 4,730,121
[45] Certificate Issued Sep. 15, 1998

[54] POWER CONTROLLER FOR CIRCUITS WITH BATTERY BACKUP

[75] Inventors: Robert D. Lee, Denton; Donald R. Dias, Carrollton, both of Tex.

[73] Assignee: Dallas Semiconductor Corporation, Dallas, Tex.

Reexamination Request:
No. 90/004,830, Nov. 10, 1997

Reexamination Certificate for:
Patent No.: 4,730,121
Issued: Mar. 8, 1988
Appl. No.: 24,687
Filed: Mar. 11, 1987

[51] Int. Cl.$^6$ .................................................. H02J 9/02
[52] U.S. Cl. ................................ 307/66; 307/64; 307/87; 365/229
[58] Field of Search ......................... 307/64, 66, 87,129; 365/229, 226, 227, 228; 361/92, 93

[56] References Cited

U.S. PATENT DOCUMENTS

| | | | |
|---|---|---|---|
| 3,757,131 | 9/1973 | Krutz et al. | 307/66 |
| 3,859,638 | 1/1975 | Hume | 365/229 |
| 3,980,935 | 9/1976 | Worst | 365/229 |
| 4,122,359 | 10/1978 | Breikss | 365/229 X |
| 4,288,865 | 9/1981 | Graham | 307/64 X |
| 4,337,524 | 6/1982 | Parkinson | 365/229 |
| 4,388,706 | 6/1983 | Butler | 365/229 X |
| 4,441,031 | 4/1984 | Moriya et al. | 307/66 |
| 4,510,401 | 4/1985 | Legoult | 307/66 |
| 4,638,175 | 1/1987 | Bradford et al. | 307/66 X |
| 4,645,943 | 2/1987 | Smith, Jr. et al. | 307/150 |

OTHER PUBLICATIONS

Dallas Semiconductor "Smart Battery" DS1260 Preliminary Data Sheet, Dec. 1985.
Lineback, J. Robert, *Backup Keeps Microsystems Working*, Electronics, The Worldwide Technology Weekly, Feb. 17, 1986, pp. 20–21.
Simon/McGarry Public Relations, Inc., *Dallas Semi's Integrated Battery Backup "Crash–Proofs" Microprocessor–Based Systems*, Feb. 17, 1986, pp. 1–5.

*Primary Examiner*—Paul Ip

[57] ABSTRACT

A power controller for selectively coupling the voltage from a primary power source to a power output terminal or coupling the voltage from a battery backup input terminal to the power output terminal includes circuitry for receiving a reset or isolation signal. After receipt of the isolation signal when the primary power source is above a first threshold voltage, the primary power source and the backup battery source will be isolated from the output power terminal on the next occurrence of the removal of the voltage from the primary power source.

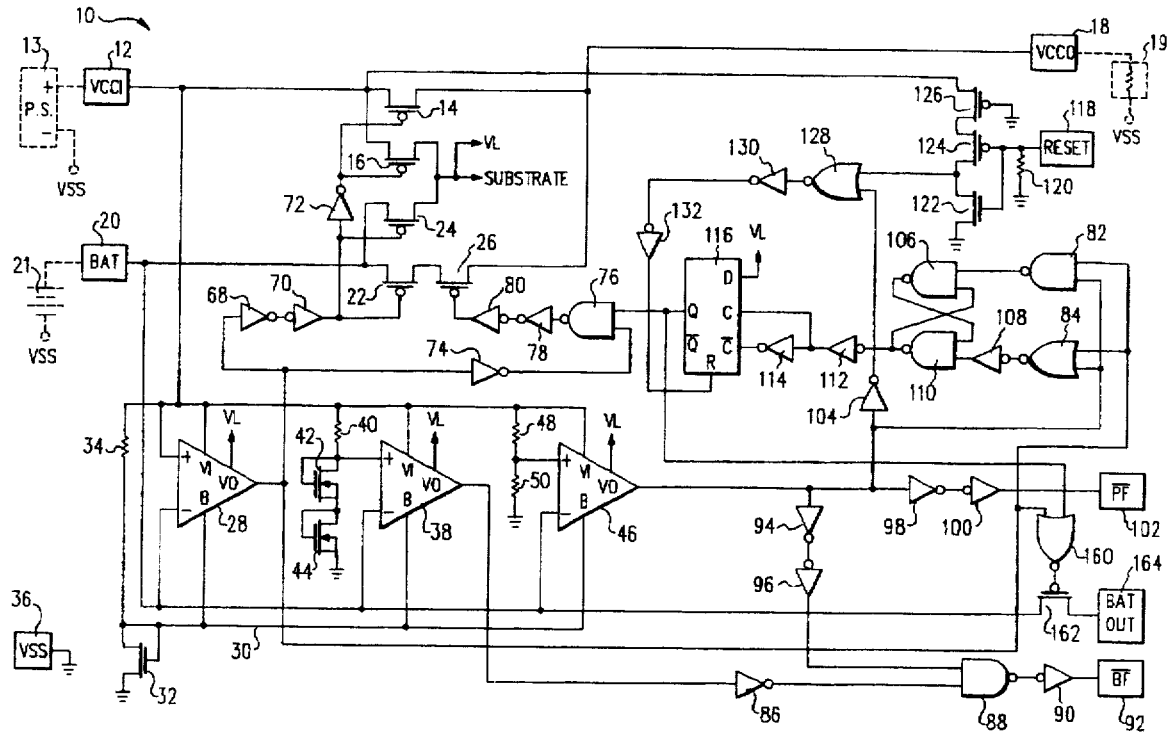

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *